(12) United States Patent
Kawaoka et al.

(10) Patent No.: US 12,366,745 B2
(45) Date of Patent: *Jul. 22, 2025

(54) LIGHT SCANNING SYSTEM AND LIGHT SCANNING DEVICE

(71) Applicant: HAMAMATSU PHOTONICS K.K., Hamamatsu (JP)

(72) Inventors: Hidetaka Kawaoka, Hamamatsu (JP); Yoshihisa Warashina, Hamamatsu (JP); Ryusuke Kitaura, Hamamatsu (JP); Daiki Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 528 days.

This patent is subject to a terminal disclaimer.

(21) Appl. No.: 17/641,192

(22) PCT Filed: Sep. 2, 2020

(86) PCT No.: PCT/JP2020/033335
§ 371 (c)(1),
(2) Date: Mar. 8, 2022

(87) PCT Pub. No.: WO2021/049397
PCT Pub. Date: Mar. 18, 2021

(65) Prior Publication Data
US 2022/0342210 A1    Oct. 27, 2022

(30) Foreign Application Priority Data

Sep. 11, 2019  (JP) ................................ 2019-165161

(51) Int. Cl.
*G02B 26/08* (2006.01)
*G02B 7/18* (2021.01)
(Continued)

(52) U.S. Cl.
CPC ......... *G02B 27/0031* (2013.01); *G02B 7/181* (2013.01); *G02B 26/0833* (2013.01); *G02B 26/101* (2013.01)

(58) Field of Classification Search
CPC ................ G02B 27/0031; G02B 7/181; G02B 26/0833; G02B 26/101; G02B 26/085; H02K 33/18
See application file for complete search history.

(56) References Cited

U.S. PATENT DOCUMENTS 9,482,864 B2    11/2016  Shimizu
2014/0268266 A1  9/2014  Shimizu
(Continued)

FOREIGN PATENT DOCUMENTS

CN    104007550 A    8/2014
CN    204867810 U    12/2015
(Continued)

OTHER PUBLICATIONS

International Preliminary Report on Patentability mailed Mar. 24, 2022 for PCT/JP2020/033335.

*Primary Examiner* — Euncha P Cherry
(74) *Attorney, Agent, or Firm* — Faegre Drinker Biddle & Reath LLP

(57) ABSTRACT

A light scanning system includes a mirror device, a magnet, a temperature sensor, and an arithmetic part. The arithmetic part generates first and second current signals based on a first target deflection angle and a first target frequency, a second target deflection angle and a second target frequency, an operating temperature, first data for correcting a change in a deflection angle of a mirror with respect to a change in a frequency of a current signal input to each of first and second drive coils, second data for correcting at least one of a shift of the mirror swinging with a first axis from a Y-axis and a shift of the mirror swinging with a second axis from an (Continued)

X-axis, and third data for correcting a change in a deflection angle of the mirror with respect to a change in the operating temperature.

19 Claims, 11 Drawing Sheets

(51) Int. Cl.
    *G02B 26/10*      (2006.01)
    *G02B 27/00*      (2006.01)

(56) References Cited

U.S. PATENT DOCUMENTS

| | | | |
|---|---|---|---|
| 2016/0131557 A1 | 5/2016 | Bossi et al. | |
| 2016/0231557 A1* | 8/2016 | Lemaire | G02B 26/085 |
| 2022/0342207 A1* | 10/2022 | Suzuki | G02B 26/085 |

FOREIGN PATENT DOCUMENTS

| | | |
|---|---|---|
| CN | 108205997 A | 6/2018 |
| CN | 108333746 A | 7/2018 |
| JP | 2003-215493 A | 7/2003 |
| JP | 2005-345904 A | 12/2005 |
| JP | 2006-039067 A | 2/2006 |
| JP | 2006-133643 A | 5/2006 |
| JP | 2009-025795 A | 2/2009 |
| JP | 2011-033980 A | 2/2011 |
| JP | 2011-150055 A | 8/2011 |
| JP | 2012-068349 A | 4/2012 |
| JP | 2012-118364 A | 6/2012 |
| JP | 2012-137692 A | 7/2012 |
| JP | 2014-126754 A | 7/2014 |
| JP | 2016-118603 A | 6/2016 |
| JP | 2018-101040 A | 6/2018 |
| JP | 7481098 B2 | 5/2024 |
| WO | WO-2011/135848 A1 | 11/2011 |
| WO | WO-2013/140757 A1 | 9/2013 |
| WO | WO-2018/159077 A1 | 9/2018 |
| WO | WO-2019/138964 A1 | 7/2019 |

\* cited by examiner

Fig.2
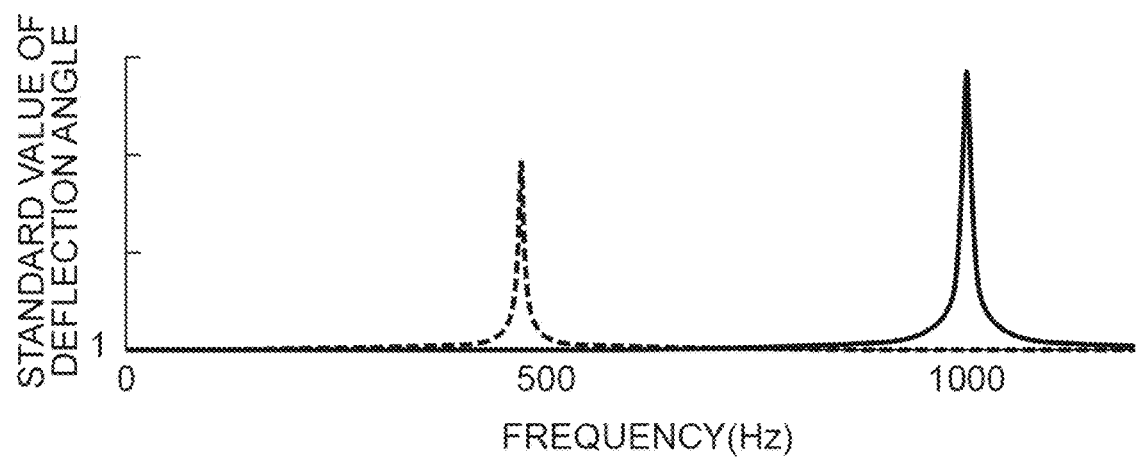
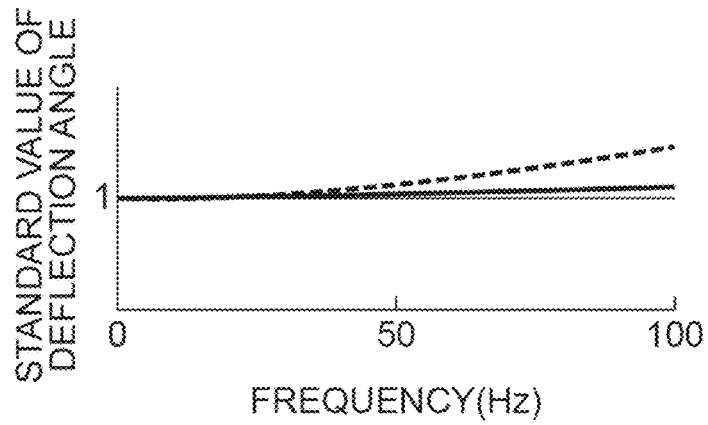

Fig.11
(a)
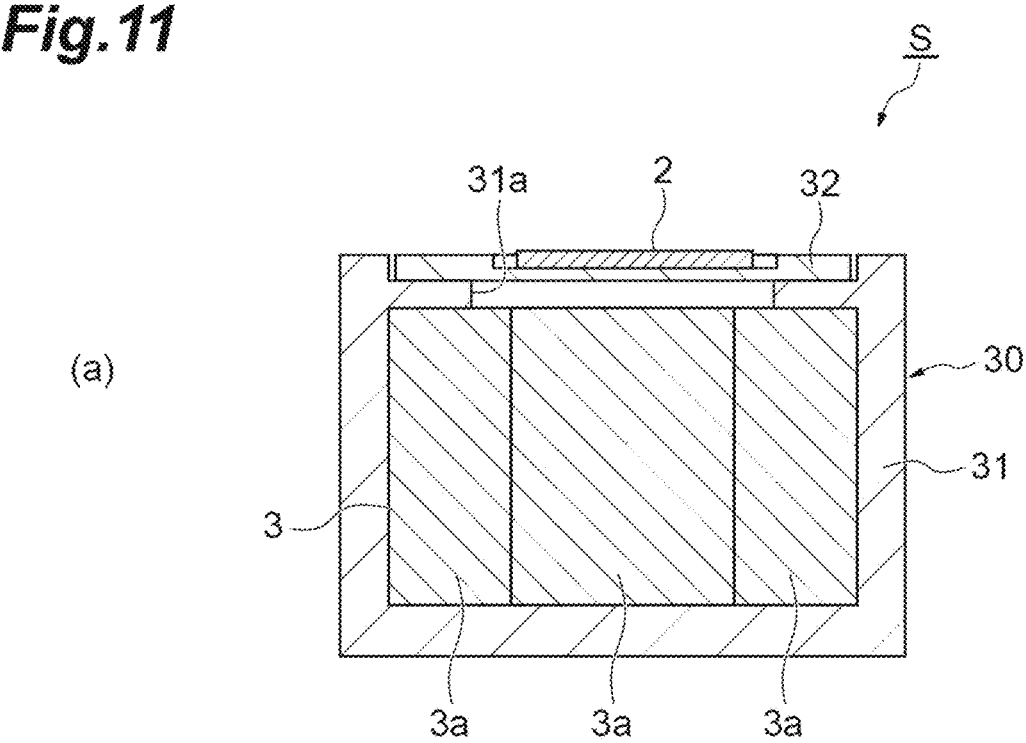
(b)
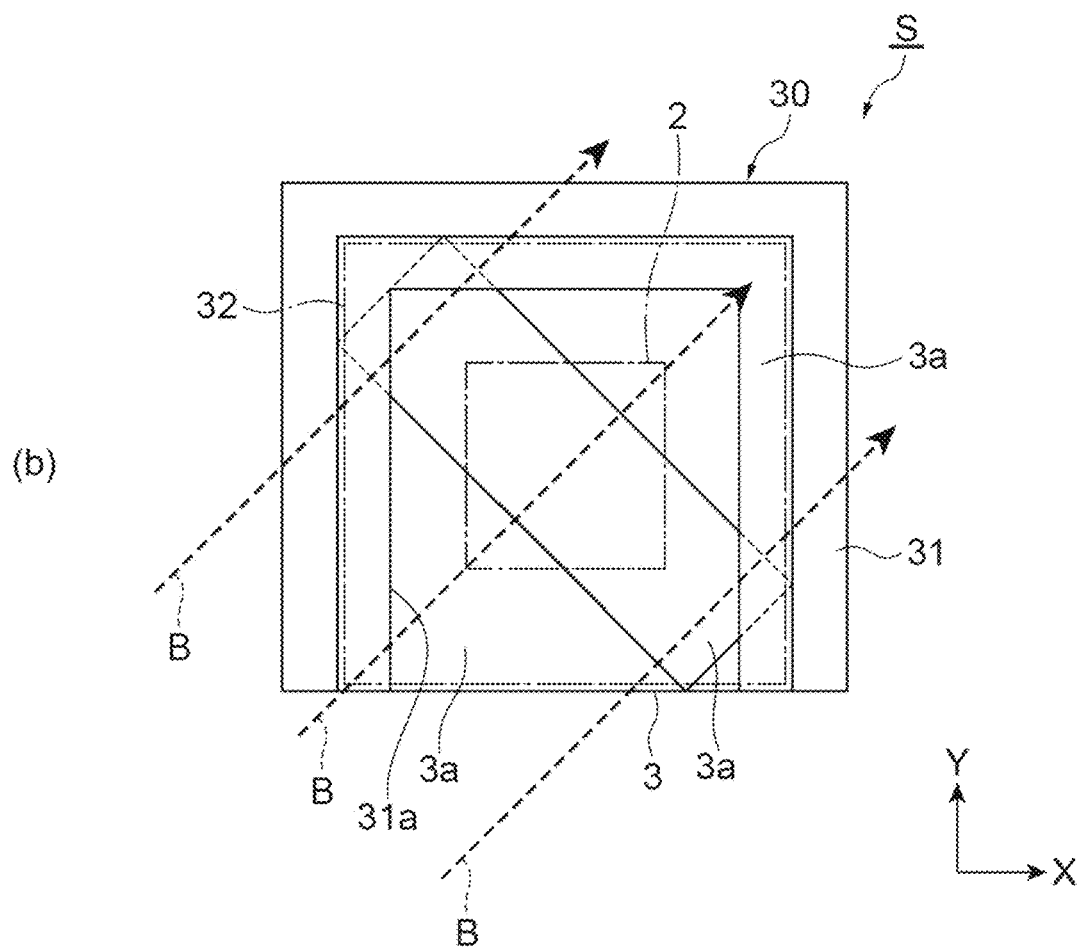

LIGHT SCANNING SYSTEM AND LIGHT SCANNING DEVICE

TECHNICAL FIELD

The present disclosure relates to a light scanning system and a light scanning apparatus.

BACKGROUND ART

There has been a known light scanning apparatus including a mirror device having a first movable part provided with a mirror, a second movable part supporting the first movable part so that the mirror can swing with a first axis along an X-axis as a central axis, and a support supporting the second movable part so that the mirror can swing with a second axis along a Y-axis as a central axis, and a magnet configured to generate a magnetic field to act on a first drive coil provided in the first movable part and a second drive coil provided in the second movable part (for example, see Patent Literature 1). In such a light scanning apparatus, the mirror may be swung in a linear mode with each of the first axis and the second axis as the central axis. Note that with regard to the mirror that swings with the first axis as the central axis, the linear mode refers to a mode in which a frequency of a current signal input to the first drive coil is lower than a resonance frequency of the mirror that swings with the first axis as the central axis, and a deflection angle of the mirror that swings with the first axis as the central axis is proportional to a current value of the current signal. In addition, with regard to the mirror that swings with the second axis as the central axis, the linear mode refers to a mode in which a frequency of a current signal input to the second drive coil is lower than a resonance frequency of the mirror that swings with the second axis as the central axis, and a deflection angle of the mirror that swings with the second axis as the central axis is proportional to a current value of the current signal.

CITATION LIST

Patent Literature

Patent Literature 1: Japanese Unexamined Patent Publication No. 2011-33980

SUMMARY OF INVENTION

Technical Problem

When the light scanning apparatus described above is used for, for example, a 3D printer, an optical interference tomograph meter, a laser scanning microscope, etc., it is necessary to suppress an error with respect to a target deflection angle to, for example, ±0.1° or less.

Therefore, an object of the present disclosure is to provide a light scanning system and a light scanning apparatus capable of implementing high-precision operation when the mirror is swung in a linear mode with each of the first axis and the second axis as the central axis.

Solution to Problem

A light scanning system of an aspect of the present disclosure includes a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis, a magnet configured to generate a magnetic field to act on the first drive coil and the second drive coil, a temperature sensor configured to measure an operating temperature of the mirror device and the magnet, and an arithmetic part configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil, in which the arithmetic part acquires the first target deflection angle and the first target frequency, and the second target deflection angle and the second target frequency, acquires the operating temperature from the temperature sensor, and generates the first current signal and the second current signal based on the first target deflection angle and the first target frequency, the second target deflection angle and the second target frequency, the operating temperature, first data for correcting a change in a deflection angle of the mirror with respect to a change in a frequency of a current signal input to each of the first drive coil and the second drive coil, second data for correcting at least one of a shift of the mirror swinging with the first axis as a central axis from the Y-axis and a shift of the mirror swinging with the second axis as a central axis from the X-axis, and third data for correcting a change in a deflection angle of the mirror with respect to a change in the operating temperature.

The present inventors have found that when the mirror is swung in a linear mode with each of the first axis and the second axis as the central axis, the change in the deflection angle of the mirror with respect to the change in the frequency of the current signal input to each of the first drive coil and the second drive coil varies for each individual (that is, for each combination of the mirror device and the magnet), the shift of the mirror swinging with the first axis as the central axis from the Y-axis and the shift of the mirror swinging with the second axis as the central axis from the X-axis vary for each individual, and the change in the deflection angle of the mirror with respect to the change in the operating temperature of the mirror device and the magnet is mainly caused by the temperature characteristic of the magnet. Therefore, by configuring the light scanning system as described above and generating the first current signal and the second current signal as described above, the mirror can be swung at the first target deflection angle and the first target frequency with the X-axis as the central axis, and the mirror can be swung at the second target deflection angle and the second target frequency with the Y-axis as the central axis. Therefore, according to the light scanning system, high-precision operation can be implemented when the mirror is swung in the linear mode with each of the first axis and the second axis as the central axis.

The light scanning system of the aspect of the present disclosure may further include a storage part configured to store the first data, the second data, and the third data, and the arithmetic part may acquire the first data, the second data, and the third data from the storage part. In this way, a system structure can be simplified.

The light scanning system of the aspect of the present disclosure may further include an input reception part configured to receive inputs of the first target deflection angle and the first target frequency, and the second target deflection angle and the second target frequency, and the arithmetic part may acquire the first target deflection angle and the first target frequency, and the second target deflection angle and the second target frequency from the input reception part. In this way, a user can easily set the first target deflection angle and the first target frequency, and the second target deflection angle and the second target frequency.

In the light scanning system of the aspect of the present disclosure, the second data may be data for correcting a shift of the mirror swinging with the first axis as a central axis from the Y-axis when the second axis is regarded as the Y-axis, and the arithmetic part generates the second current signal to correct a shift of the mirror swinging with the first axis as a central axis from the Y-axis. In this way, it is possible to reduce a processing load when the arithmetic part generates the first current signal and the second current signal.

A light scanning apparatus according to an aspect of the present disclosure includes a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis, a magnet configured to generate a magnetic field to act on the first drive coil and the second drive coil, and an arithmetic device configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil, in which the arithmetic device acquires data based on the first target deflection angle and the first target frequency, the second target deflection angle and the second target frequency, and first data for correcting a change in a deflection angle of the mirror with respect to a change in a frequency of a current signal input to each of the first drive coil and the second drive coil, acquires an operating temperature of the mirror device and the magnet, and generates the first current signal and the second current signal based on the data, the operating temperature, second data for correcting at least one of a shift of the mirror swinging with the first axis as a central axis from the Y-axis and a shift of the mirror swinging with the second axis as a central axis from the X-axis, and third data for correcting a change in a deflection angle of the mirror with respect to a change in the operating temperature.

According to this light scanning apparatus, for the same reason as described above, high-precision operation can be implemented when the mirror is swung in the linear mode with each of the first axis and the second axis as the central axis.

The light scanning apparatus according to the aspect of the present disclosure may further include a temperature sensor configured to measure the operating temperature, and the arithmetic device may acquire the operating temperature from the temperature sensor. In this way, it is possible to acquire an appropriate operating temperature.

The light scanning apparatus according to the aspect of the present disclosure may further include a storage device configured to store the second data and the third data, and the arithmetic device may acquire the second data and the third data from the storage device. In this way, a device configuration can be simplified.

In the light scanning apparatus according to the aspect of the present disclosure, the second data may be data for correcting a shift of the mirror swinging with the first axis as a central axis from the Y-axis when the second axis is regarded as the Y-axis, and the arithmetic device may generate the second current signal to correct a shift of the mirror swinging with the first axis as a central axis from the Y-axis. In this way, it is possible to reduce a processing load when the arithmetic device generates the first current signal and the second current signal.

Advantageous Effects of Invention

According to the present disclosure, it is possible to provide a light scanning system and a light scanning apparatus capable of implementing high-precision operation when the mirror is swung in a linear mode with each of the first axis and the second axis as the central axis.

BRIEF DESCRIPTION OF DRAWINGS

FIG. 2 is a graph illustrating a relationship between a frequency of a current signal and a standard value of a deflection angle of a mirror.

FIG. 11 is a cross-sectional view and a plan view of a part of the light scanning system illustrated in FIG. 1.

DESCRIPTION OF EMBODIMENTS

Hereinafter, an embodiment of the present disclosure will be described in detail with reference to the drawings. Note that in each figure, the same or corresponding parts are designated by the same reference symbols, and overlapping parts are omitted.

[Configuration of Light Scanning System]

Figure 1:
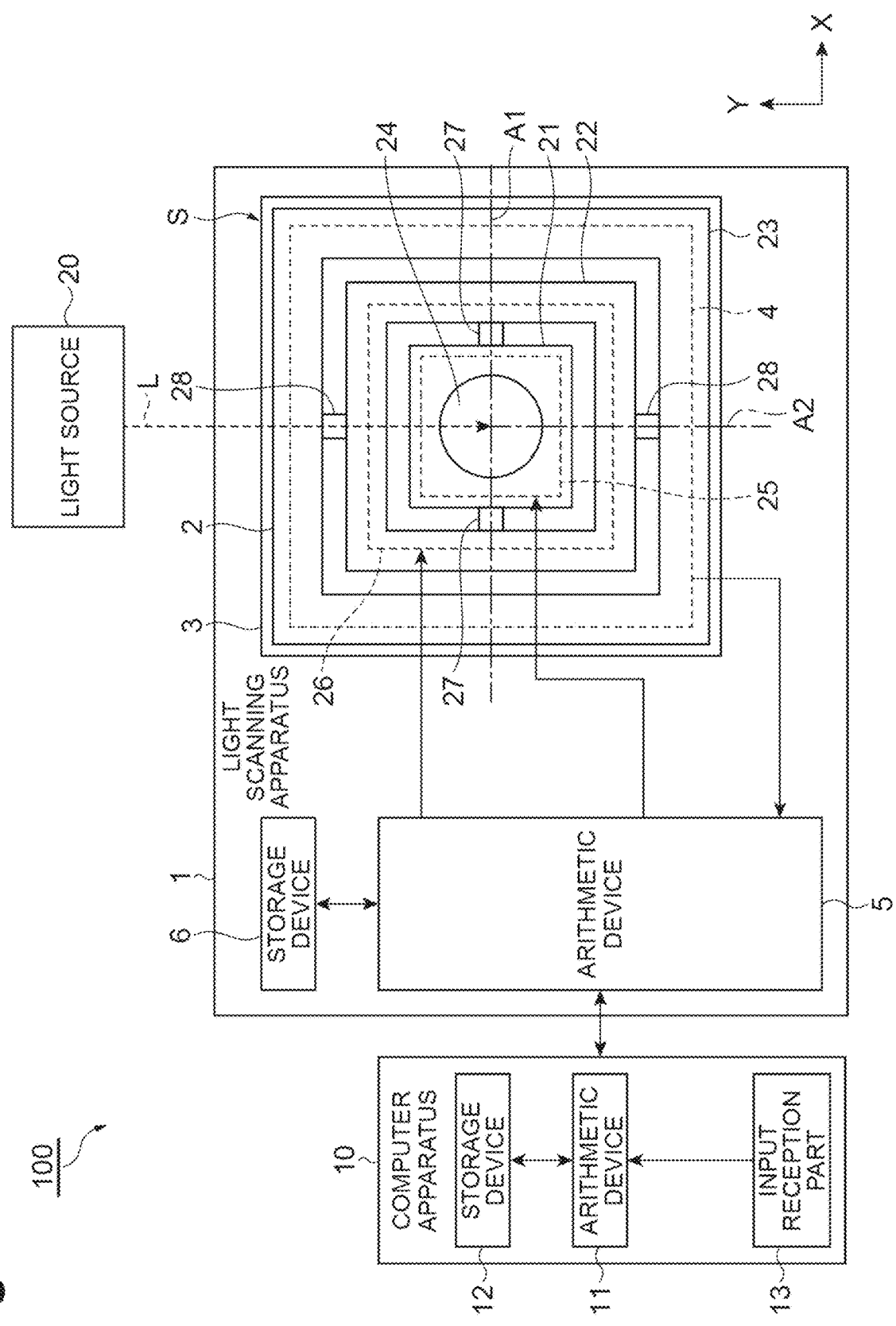
FIG. 1 is a configuration diagram of a light scanning system according to an embodiment.

A light scanning system 100 illustrated in FIG. 1 is a system applied to, for example, a 3D printer, an optical interference tomograph meter, a laser scanning microscope, etc. As illustrated in FIG. 1, the light scanning system 100 includes a light scanning apparatus 1, a computer apparatus 10, and a light source 20.

The computer apparatus 10 is, for example, a PC (Personal Computer), and has an arithmetic device (arithmetic part) 11, a storage device (storage part) 12, and an input reception part 13. The arithmetic device 11 includes, for example, a CPU (Central Processing Unit), etc. The storage device 12 has, for example, an HD (Hard Disk), etc. The input reception part 13 includes, for example, a keyboard, a mouse, a GUI (Graphical User Interface), etc. The light source 20 includes, for example, an LD (Laser Diode), an LED (Light Emission Diode), etc. The light scanning apparatus 1 can be electrically connected to the computer apparatus 10. The light scanning apparatus 1 can scan laser light L emitted from the light source 20 along each of a direction parallel to an X-axis and a direction parallel to a Y-axis intersecting the X-axis. Note that in the present embodiment, the X-axis and the Y-axis are orthogonal to each other.

[Configuration of Light Scanning Apparatus]

The light scanning apparatus 1 includes a mirror device 2, a magnet 3, a temperature sensor 4, an arithmetic device (arithmetic part) 5, and a storage device (storage part) 6.

The mirror device 2 is, for example, a device formed by MEMS (Micro Electro Mechanical Systems) technology using an SOI (Silicon on Insulator) substrate. The mirror device 2 has a first movable part 21, a second movable part 22, and a support 23. The first movable part 21 is provided with a mirror 24 and a first drive coil 25. The second movable part 22 is provided with a second drive coil 26.

The second movable part 22 supports the first movable part 21 so that the mirror 24 can swing with a first axis A1 along the X-axis as a central axis. In the present embodiment, the second movable part 22 is formed in a frame shape to surround the first movable part 21, and is connected to the movable part 21 via a pair of torsion bars 27 disposed on the first axis A1. The support 23 supports the second movable part 22 so that the mirror 24 can swing with a second axis A2 along the Y-axis as a central axis. In the present embodiment, the support 23 is formed in a frame shape to surround the second movable part 22, and is connected to the second movable part 22 via a pair of torsion bars 28 disposed on the second axis A2.

The mirror 24 reflects the laser light L emitted from the light source 20. The mirror 24 is, for example, a metal film formed on a surface of the first movable part 21. The first drive coil 25 is, for example, a metal wiring embedded in the first movable part 21, and extends spirally along an outer edge of the first movable part 21. The second drive coil 26 is, for example, a metal wiring embedded in the second movable part 22, and extends in a spiral shape along an outer edge of the second movable part 22.

The magnet 3 generates a magnetic field acting on the first drive coil 25 and the second drive coil 26. In the present embodiment, as illustrated in (a) and (b) of FIG. 11, a plurality of magnet members 3a is arranged in a Halbach array to form the magnet 3. For example, a magnet unit 30 is configured by holding the magnet 3 by a package-shaped holding member 31. Further, a device structure S is configured by fixing the mirror device 2 to the magnet unit 30 via, for example, a base 32 made of ceramic. Specifically, to close an opening 31a formed in the holding member 31, the base 32 is fixed to the holding member 31 by, for example, adhesion, and the mirror device 2 is fixed to the base 32 by, for example, adhesion. In the device structure S, a direction of a magnetic field B generated by the magnet 3 forms an angle of 45° with respect to each of the X-axis and the Y-axis. Note that in the device structure S illustrated in (a) and (b) of FIG. 11, the mirror device 2 is indirectly fixed to the magnet 3 (via the holding member 31 and the base 32). However, the mirror device 2 may be directly fixed to the magnet 3.

The temperature sensor 4 measures an operating temperature (including data corresponding to the operating temperature) of the mirror device 2 and the magnet 3. The operating temperature of the mirror device 2 and the magnet 3 (hereinafter, simply referred to as "operating temperature") refers to a temperature of a region where the mirror device 2 and the magnet 3 are disposed in the light scanning apparatus 1, a temperature of a member to which the magnet 3 is connected, a temperature of the magnet 3, etc., and refers to those temperatures in a state where the light scanning apparatus 1 is operating. In the present embodiment, the temperature sensor 4 is a resistor (wiring) provided on the support 23 of the mirror device 2. As an example, the resistor is configured as a coil and extends spirally along an outer edge of the support 23. The resistor is made of a material whose resistance value changes depending on the temperature (for example, a metal material such as tungsten, aluminum, gold, silver, copper, or an aluminum alloy). In the light scanning apparatus 1, the storage device 6 stores a relationship between a temperature and a resistance value in the temperature sensor 4, and the arithmetic device 5 acquires an operating temperature based on the relationship and the resistance value of the temperature sensor 4. That is, in this case, the resistance value of the temperature sensor 4 is data corresponding to the operating temperature.

The arithmetic device 5 includes, for example, an FPGA (field-programmable gate array), etc. The arithmetic device 5 inputs a first current signal to the first drive coil 25, for example, via a constant current circuit (not illustrated). The arithmetic device 5 inputs a second current signal to the second drive coil 26, for example, via a constant current circuit (not illustrated). The arithmetic device 5 acquires the operating temperature (signal indicating the operating temperature) from the temperature sensor 4 via, for example, an amplifier (not illustrated). The storage device 6 is, for example, a nonvolatile memory such as an EEPROM (Electrically Erasable Programmable Read-Only Memory). The storage device 6 stores various data.

The first current signal input to the first drive coil 25 is a current signal for swinging the mirror 24 with the X-axis as the central axis at a first target deflection angle and a first target frequency in a linear mode. The second current signal input to the second drive coil 26 is a current signal for swinging the mirror 24 with the Y-axis as the central axis at a second target deflection angle and a second target frequency in a linear mode. In the present embodiment, the first target frequency is lower than a resonance frequency of the mirror 24 swinging with the first axis A1 as the central axis, and the second target frequency is lower than a resonance frequency of the mirror 24 swinging with the second axis A2 as the central axis.

When the first current signal is input to the first drive coil 25, a Lorentz force acts on the first drive coil 25 due to an interaction with the magnetic field generated by the magnet 3. By utilizing a balance between the Lorentz force and an elastic force of the pair of torsion bars 27, the mirror 24 can be swung in the linear mode with the X-axis as the central axis. When the second current signal is input to the second drive coil 26, a Lorentz force acts on the second drive coil 26 due to an interaction with the magnetic field generated by the magnet 3. By utilizing a balance between the Lorentz force and an elastic force of the pair of torsion bars 28, the mirror 24 can be swung in the linear mode with the Y-axis as the central axis.

[Method for Generating First Current Signal and Second Current Signal]

First, a characteristic of the device structure S (see FIGS. 1 and 11) including the mirror device 2 and the magnet 3 will be described with reference to FIGS. 2, 3 and 4. In the present embodiment, the device structure S is assembled by fixing the mirror device 2 to the magnet unit 30 (see FIG. 11) including the magnet 3 by, for example, adhesion.

(a) and (b) of FIG. 2 are graphs illustrating a relationship between a frequency of a current signal and a standard value of a deflection angle of the mirror 24. In (a) and (b) of FIG. 2, a solid line indicates a relationship between a frequency of a current signal input to the first drive coil 25 and a standard value of a deflection angle of the mirror 24 swinging with the first axis A1 as the central axis, and a broken line indicates a relationship between a frequency of a current signal input to the second drive coil 26 and a standard value of a deflection angle of the mirror 24 swinging with the second axis A2 as the central axis. Note that (b) of FIG. 2 illustrates an enlarged portion of (a) of FIG. 2 where the frequency of the current signal is 100 Hz or less.

When the frequency of the current signal is changed while the amplitude of the current signal is fixed, the standard value of the deflection angle of the mirror 24 here is a value standardized by setting a deflection angle of the mirror 24 to 1 when the frequency of the current signal is the reference frequency (for example, 0 Hz). Since the resonance frequency of the mirror 24 swinging with the first axis A1 as the central axis is about 1,000 Hz, and the resonance frequency of the mirror 24 swinging with the second axis A2 as the central axis is about 470 Hz, when the frequency of the current signal is 100 Hz or less, the mirror 24 swings in the linear mode (that is, the deflection angle of the mirror 24 is proportional to the amplitude of the current signal), and ideally the standard value of the deflection angle of the mirror 24 is 1. However, as illustrated in (b) of FIG. 2, in reality, the standard value of the deflection angle of the mirror 24 does not become 1. For example, when the light scanning system 100 is applied to a 3D printer, an optical interference tomograph meter, a laser scanning microscope, etc., it is necessary to suppress an error with respect to the target deflection angle to, for example, ±0.1° or less. In that case, it is necessary to correct a change in the standard value of the deflection angle of the mirror 24 with respect to a change in the frequency of the current signal.

Figure 3:
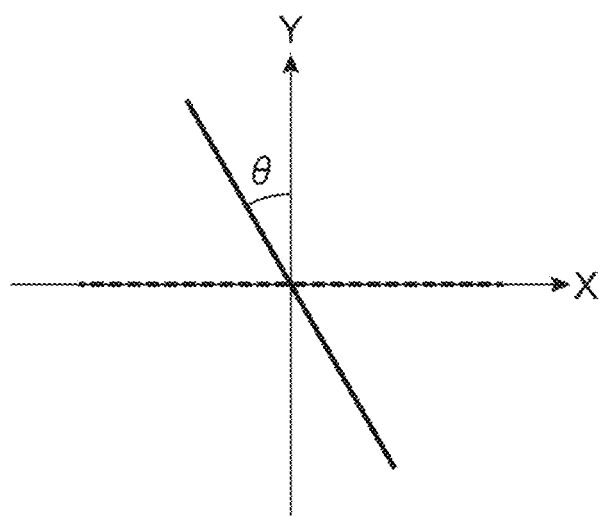
FIG. 3 is a diagram illustrating a shift of a mirror swinging with a first axis as a central axis from a Y-axis and a shift of a mirror swinging with a second axis as a central axis from an X-axis.

FIG. 3 is a diagram illustrating a shift of the mirror 24 swinging with the first axis A1 as the central axis from the Y-axis and a shift of the mirror 24 swinging with the second axis A2 as the central axis from the X-axis. In FIG. 3, a solid line indicates the shift of the mirror 24 swinging with the first axis A1 as the central axis from the Y-axis, and a broken line indicates shift of the mirror 24 swinging with the second axis A2 as the central axis from the X-axis.

When a current signal is input to the first drive coil 25 without inputting a current signal to the second drive coil 26 and the laser light L is incident on the mirror 24 along a direction perpendicular to the X-axis and the Y-axis, a scanning direction of the laser light L reflected by the mirror 24 may shift from the Y-axis. In this case, a shift of the scanning direction of the laser light L from the Y-axis corresponds to a shift of the mirror 24 swinging with the first axis A1 as the central axis from the Y-axis. When a current signal is input to the second drive coil 26 without inputting a current signal to the first drive coil 25 and the laser light L is incident on the mirror 24 along the direction perpendicular to the X-axis and the Y-axis, a scanning direction of the laser light L reflected by the mirror 24 may shift from the X-axis. In this case, a shift of the scanning direction of the laser light L from the X-axis corresponds to a shift of the mirror 24 swinging with the second axis A2 as the central axis from the X-axis. Note that the shift of the mirror 24 swinging with the first axis A1 as the central axis from the Y-axis corresponds to the shift of the scanning direction of the laser light L scanned by the mirror 24 swinging with the first axis A1 as the central axis from the Y-axis, and the shift of the mirror 24 swinging with the second axis A2 as the central axis from the X-axis corresponds to the shift of the scanning direction of the laser light L scanned by the mirror 24 swinging with the second axis A2 as the central axis from the X-axis.

In the device structure S, ideally, the direction of the magnetic field generated by the magnet 3 forms an angle of 45° with respect to each of the X-axis and the Y-axis. Therefore, as illustrated in FIG. 3, when the device structure S is disposed so that the mirror 24 swinging with the second axis A2 as the central axis does not shift from the X-axis, the mirror 24 swinging with the first axis A1 as the central axis shifts by θ from the Y-axis. This shift θ varies due to a position shift when the mirror device 2 is fixed to the magnet unit 30 including the magnet 3. For example, when the light scanning system 100 is applied to a 3D printer, an optical interference tomograph meter, a laser scanning microscope, etc., it is necessary to suppress the error with respect to the target deflection angle to, for example, ±0.1° or less. In that case, it is necessary to correct the shift θ of the mirror 24 swinging with the first axis A1 as the central axis from the Y-axis.

Figure 4:
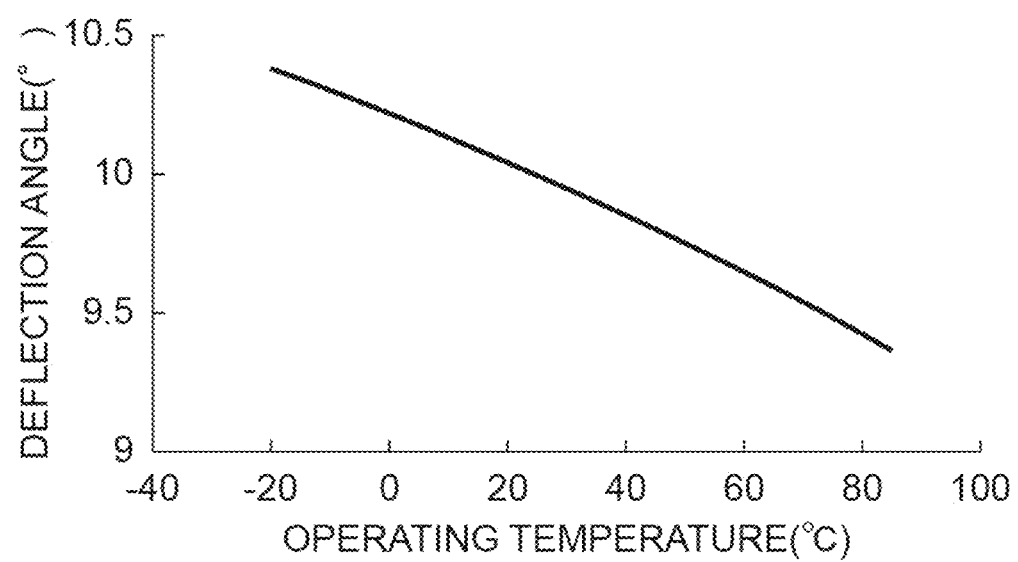
FIG. 4 is a graph illustrating a relationship between an operating temperature and a deflection angle of a mirror.

FIG. 4 is a graph illustrating a relationship between the operating temperature and the deflection angle of the mirror 24 swinging with the first axis A1 as the central axis. As illustrated in FIG. 4, even when a current value at which the deflection angle of the mirror 24 becomes 10° is input to the first drive coil 25 when the operating temperature is 25°, if the operating temperature changes, the deflection angle of the mirror 24 changes. That is, the deflection angle of the mirror 24 swinging with the first axis A1 as the central axis changes according to the change in the operating temperature. Similarly, the deflection angle of the mirror 24 swinging with the second axis A2 as the central axis changes according to the change in the operating temperature.

For example, when the light scanning system 100 is applied to a 3D printer, an optical interference tomograph meter, a laser scanning microscope, etc., it is necessary to suppress the error with respect to the target deflection angle to, for example, ±0.1° or less. In that case, it is necessary to correct the change in the deflection angle of the mirror 24 with respect to the change in the operating temperature. Note that the change in the deflection angle of the mirror 24 with respect to the change in the operating temperature mainly results from the fact that the magnetic field generated by the magnet 3 changes due to the change in the operating temperature. The resonance frequency of the swinging mirror 24, a Q-value of the resonance frequency, etc. affects the change in the deflection angle of the mirror 24 with respect to the change in the operating temperature. However, a degree of these influences is, for example, about $1/100$, where 1 is a degree of an influence of the change in the magnetic field with respect to the change in the operating temperature.

From the above knowledge about the characteristic of the device structure S, in the light scanning system 100, first data, second data, and third data are acquired in a manufacturing process of the light scanning apparatus 1, the first data is stored in the storage device 12 of the computer apparatus 10, and the second data and the third data are stored in the storage device 6 of the light scanning apparatus 1 (details will be described later). The first data is data for correcting the change in the standard value of the deflection angle of the mirror 24 with respect to the change in the frequency of the current signal. The second data is data for correcting the shift θ of the mirror 24 swinging with the first axis A1 as the central axis from the Y-axis. The third data is data for correcting the change in the deflection angle of the mirror 24 with respect to the change in the operating temperature. Note that the first data may be data for correcting "resonance frequency component that induces ringing" included in the first target deflection angle of the mirror 24 swinging with the X-axis as the central axis and a second target deflection angle of the mirror 24 swinging with the Y-axis as the central axis. Further, the first data may be data for correcting "deflection angle—frequency characteristic" representing a relationship between the deflection angle and the frequency of the mirror 24 swinging with the first axis A1 and the second axis A2 as the central axis.

Figure 5:
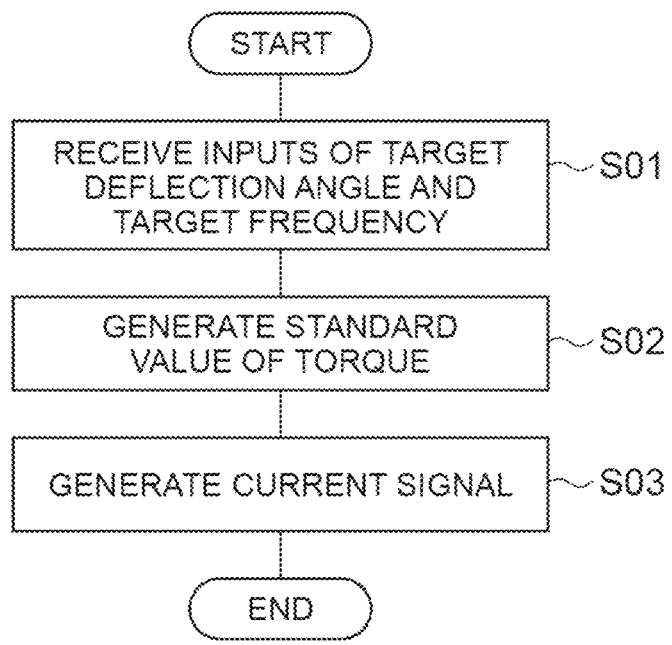
FIG. 5 is a flowchart of a method for generating a first current signal and a second current signal implemented in the light scanning system illustrated in FIG. 1.

Hereinafter, a method for generating the first current signal and the second current signal, which is carried out in the light scanning system 100, will be described with reference to FIG. 5. Note that the first current signal is a current signal input to the first drive coil 25, and is a current signal for swinging the mirror 24 with the X-axis as the central axis at the first target deflection angle and the first target frequency in the linear mode. Further, the second current signal is a current signal input to the second drive coil 26, and is a current signal for swinging the mirror 24 with the Y-axis as the central axis at the second target deflection angle and the second target frequency in the linear mode.

First, a user inputs the first target deflection angle and the first target frequency, and the second target deflection angle and the second target frequency by using the input reception part 13 of the computer apparatus 10. That is, the input reception part 13 receives inputs of the first target deflection angle and the first target frequency, and the second target deflection angle and the second target frequency (S01).

Subsequently, the arithmetic device 11 of the computer apparatus 10 calculates a standard value of a first torque and a standard value of a second torque (data based on the first target deflection angle and the first target frequency, the second target deflection angle and the second target frequency, and the first data) based on the first target deflection angle and the first target frequency, the second target deflection angle and the second target frequency, and the first data (data for correcting a change in the standard value of the deflection angle of the mirror 24 with respect to a change in the frequency of the current signal), and generates the standard value of the first torque and the standard value of the second torque (S02). At this time, the arithmetic device 11 acquires the first target deflection angle and the first target frequency, and the second target deflection angle and the second target frequency from the input reception part 13, and acquires the first data from the storage device 12.

The standard value of the first torque corresponds to the torque generated in the pair of torsion bars 27 when the current signal is input to the first drive coil 25 without inputting the current signal to the second drive coil 26, and is calculated by Equation (1). The standard value of the second torque corresponds to the torque generated in the pair of torsion bars 28 when the current signal is input to the second drive coil 26 without inputting the current signal to the first drive coil 25, and is calculated by Equation (2).

[Equation 1]

$$T'_{1X}(t) = F^{-1}[T'_{1X}(f)] = F^{-1}\left[\frac{\theta_{1X}(f)}{M'_{1X}(f)}\right] = F^{-1}\left[\frac{F[\theta_{1X}(t)]}{M'_{1X}(f)}\right] \quad (1)$$

[Equation 2]

$$T'_{2Y}(t) = F^{-1}[T'_{2Y}(f)] = F^{-1}\left[\frac{\theta_{2Y}(f)}{M'_{2Y}(f)}\right] = F^{-1}\left[\frac{F[\theta_{2Y}(t)]}{M'_{2Y}(f)}\right] \quad (2)$$

In Equation (1), $T'_{1X}$: the standard value of the first torque, $\theta_{1X}$: the first target deflection angle. In Equation (2), $T'_{2Y}$: the standard value of the second torque, and $\theta_{2Y}$: the second target deflection angle. Note that "(t)" represents a function of time, and "(f)" represents a function of frequency. Further, "F" indicates that the Fourier transform is performed, and "$F^{-1}$" indicates that the inverse Fourier transform is performed.

Therefore, in Equation (1), $\theta_{1X}(t)$ corresponds to a signal determined by the first target deflection angle and the first target frequency, and $M'_{1X}(f)$ corresponds to "the change in the standard value of the deflection angle of the mirror 24 with respect to the change in the frequency of the current signal input to the first drive coil 25" (that is, the first data) when the current signal is input to the first drive coil 25 without inputting the current signal to the second drive coil 26. In addition, in Equation (2), $\theta_{2Y}(t)$ corresponds to a signal determined by the second target deflection angle and the second target frequency, and $M'_{2Y}(f)$ corresponds to "the change in the standard value of the deflection angle of the mirror 24 with respect to the change in the frequency of the current signal input to the second drive coil 26" (that is, the first data) when the current signal is input to the second drive coil 26 without inputting the current signal to the first drive coil 25.

Subsequently, the arithmetic device 5 of the light scanning apparatus 1 calculates the first current signal and the second current signal based on the standard value of the first torque, the standard value of the second torque, the operating temperature, the second data (data for correcting the shift θ of the mirror 24 swinging with the first axis A1 as the central axis from the Y-axis), and the third data (data for correcting the change in the deflection angle of the mirror 24 with respect to the change in the operating temperature), and generates the first current signal and the second current signal (S03). At this time, the arithmetic device 5 acquires the standard value of the first torque and the standard value of the second torque from the arithmetic device 11 of the computer apparatus 10, acquires the operating temperature from the temperature sensor 4, and acquires the second data and the third data from the storage device 6.

As an example, focusing on the first movable part 21, the first drive coil 25, and the pair of torsion bars 27, a relationship of Equation (3) is established for the current signal input to the first drive coil 25, the torque generated in the pair of torsion bars 27, and the magnetic field acting on the first drive coil 25.

[Equation 3]

$$I(t) = \frac{T(t)}{L \times B(\theta(t))} = \frac{1}{L \times B(\theta(t))} \cdot F^{-1}\left[\frac{\theta(f)}{M(f)}\right] = \frac{1}{B \prime(\theta(t))} \cdot F^{-1}\left[\frac{\theta(f)]}{M'(f)}\right] \quad (3)$$

In Equation (3), I: the current signal, T: the torque, L: a distance between the pair of torsion bars 27 and the first drive coil 25 in the direction parallel to the Y-axis, B: a magnetic field, B': the standard value of the magnetic field, and θ: the deflection angle. In Equation (3), M(f) corresponds to a change in the deflection angle of the mirror 24 with respect to a change in the frequency of the current signal input to the first drive coil 25, and M'(f) corresponds to a change in the standard value of the deflection angle of the mirror 24 with respect to a change in the frequency of the current signal input to the first drive coil 25. Note that "(θ(t))" represents a function of the deflection angle of the mirror 24.

The first current signal is calculated by Equation (4) on the premise of the relation of Equation (3). The second current signal is calculated by Equation (5) on the premise of the relation of Equation (3).

[Equation 4]

$$I_1(t, \Delta T) = \frac{T'_{1X}(t)}{G_{1X}(\Delta T) \cdot B'_{1Y}(\theta_{1X}(t))} \tag{4}$$

[Equation 5]

$$I_2(t, \Delta T) = \frac{1}{G_{2Y}(\Delta T) \cdot B'_{2X}(\theta_{2Y}(t))} \cdot \left[ T'_{2Y}(t) - \frac{G_{1Y}(\Delta T)}{G_{1X}(\Delta T)} \cdot \frac{B'_{1X}(\theta_{2Y}(t))}{B'_{1Y}(\theta_{2Y}(t))} \cdot T'_{1X}(t) \right] \tag{5}$$

In Equations (4) and (5), $I_1$: the first current signal, $I_2$: the second current signal, and $\Delta T$: a difference between the operating temperature and a reference temperature (for example, 25° C.) (hereinafter referred to as "temperature difference"). Note that "(t, ΔT)" represents a function of time and temperature difference, and "(ΔT)" represents a function of temperature difference. Further, "($\theta_{1X}(t)$)" represents a function of a signal determined by the first target deflection angle and the first target frequency, and "($\theta_{2Y}(t)$)" represents a function of a signal determined by the second target deflection angle and the second target frequency.

In Equations (4) and (5), $B'_{1Y}(\theta_{1X}(t))$ is "a standard value of a component of a magnetic field acting on the first drive coil 25 along the Y-axis" (corresponding to the second data) when the current signal is input to the first drive coil 25 without inputting the current signal to the second drive coil 26, and is represented by, for example, a third-order polynomial of Equation (6) ($a_1$, $a_2$, and $a_3$: constants). In Equation (5), $B'_{2X}(\theta_{2Y}(t))$ is "a standard value of a component of a magnetic field acting on the second drive coil 26 along the X-axis" (corresponding to the second data) when the current signal is input to the second drive coil 26 without inputting the current signal to the first drive coil 25, and is represented by, for example, a third-order polynomial of Equation (7) ($b_1$, $b_2$, and $b_3$: constants). In Equation (5), $B'_{1X}(\theta_{2Y}(t))$ is "a standard value of a component of a magnetic field acting on the first drive coil 25 along the X-axis" (corresponding to the second data) when the current signal is input to the first drive coil 25 without inputting the current signal to the second drive coil 26, and is represented by, for example, a third-order polynomial of Equation (8) ($c_1$, $c_2$, and $c_3$: constants).

[Equation 6]

$$\frac{1}{B'_{1Y}(\theta_{1X}(t))} = a_3 \theta_{1X}(t)^2 + a_2 \theta_{1X}(t) + a_1 \tag{6}$$

[Equation 7]

$$\frac{1}{B'_{2X}(\theta_{2Y}(t))} = b_3 \theta_{2Y}(t)^2 + b_2 \theta_{2Y}(t) + b_1 \tag{7}$$

[Equation 8]

$$\frac{1}{B'_{1X}(\theta_{2Y}(t))} = c_3 \theta_{2Y}(t)^2 + c_2 \theta_{2Y}(t) + c_1 \tag{8}$$

In Equations (4) and (5), $G_{1X}(\Delta T)$ is a coefficient for correcting a temperature characteristic of "the standard value of the deflection angle of the mirror 24 swinging with the X-axis as the central axis" (corresponding to the third data) when the current signal is input to the first drive coil 25 without inputting the current signal to the second drive coil 26, is represented by, for example, a quadratic polynomial of Equation (9) ($d_1$ and $d_2$: constants). In Equation (5), $G_{2Y}(\Delta T)$ is a coefficient for correcting a temperature characteristic of "the standard value of the deflection angle of the mirror 24 swinging with the Y-axis as the central axis" (corresponding to the third data) when the current signal is input to the second drive coil 26 without inputting the current signal to the first drive coil 25, is represented by, for example, a quadratic polynomial of Equation (10) ($e_1$ and $e_2$: constants). In Equation (5), $G_{1Y}(\Delta T)$ is a coefficient for correcting a temperature characteristic of "the standard value of the deflection angle of the mirror 24 swinging with the X-axis as the central axis" (corresponding to the third data) when the current signal is input to the first drive coil 25 without inputting the current signal to the second drive coil 26, is represented by, for example, a quadratic polynomial of Equation (11) ($g_1$ and $g_2$: constants).

[Equation 9]

$$G_{1X}(\Delta T) = d_2 \Delta T^2 + d_1 \Delta T + 1 \tag{9}$$

[Equation 10]

$$G_{2Y}(\Delta T) = e_2 \Delta T^2 + e_1 \Delta T + 1 \tag{10}$$

[Equation 11]

$$G_{1Y}(\Delta T) = g_2 \Delta T^2 + g_1 \Delta T + 1 \tag{11}$$

[Actions and Effects of Light Scanning System and Light Scanning Apparatus]

The present inventors have found that when the mirror 24 is swung in a linear mode with each of the first axis A1 and the second axis A2 as the central axis, the change in the standard value of the deflection angle of the mirror 24 with respect to the change in the frequency of the current signal input to each of the first drive coil 25 and the second drive coil 26 varies for each individual (that is, for each combination of the mirror device 2 and the magnet 3), the shift of the mirror 24 swinging with the first axis A1 as the central axis from the Y-axis and the shift of the mirror 24 swinging with the second axis A2 as the central axis from the X-axis vary for each individual, and the change in the deflection angle of the mirror 24 with respect to the change in the operating temperature is mainly caused by the temperature characteristic of the magnet 3. Therefore, by configuring the light scanning system 100 as described above and generating the first current signal and the second current signal as described above, the mirror 24 can be swung at the first target deflection angle and the first target frequency with the X-axis as the central axis, and the mirror 24 can be swung at the second target deflection angle and the second target frequency with the Y-axis as the central axis. Therefore, according to the light scanning system 100, high-precision operation can be implemented when the mirror 24 is swung in the linear mode with each of the first axis A1 and the second axis A2 as the central axis.

Further, in the light scanning system 100, the storage device 12 of the computer apparatus 10 stores the first data, and the arithmetic device 11 of the computer apparatus 10 acquires the first data from the storage device 12. Further, the storage device 6 of the light scanning apparatus 1 stores the second data and the third data, and the arithmetic device 5 of the light scanning apparatus 1 acquires the second data and the third data from the storage device 6. In this way, a system structure can be simplified.

Further, in the light scanning system 100, the input reception part 13 of the computer apparatus 10 receives inputs of the first target deflection angle and the first target frequency, and the second target deflection angle and the second target frequency, and the arithmetic device 11 of the computer apparatus 10 acquires the first target deflection angle and the first target frequency, and the second target deflection angle and the second target frequency from the input reception part 13. In this way, the user can easily set the first target deflection angle and the first target frequency, and the second target deflection angle and the second target frequency.

Further, in the light scanning system 100, the second data is data for correcting the shift of the mirror 24 swinging with the first axis A1 as the central axis from the Y-axis when the second axis A2 is regarded as the Y-axis, and the arithmetic device 5 of the light scanning apparatus 1 generates a second current signal so that the shift of the mirror 24 swinging with the first axis A1 as the central axis from the Y-axis is corrected. In this way, a processing load when the arithmetic device 5 generates the first current signal and the second current signal can be reduced.

Further, according to the light scanning apparatus 1, for the same reason as described above, high-precision operation can be implemented when the mirror 24 is swung in the linear mode with each of the first axis A1 and the second axis A2 as the central axis.

Further, in the light scanning apparatus 1, the temperature sensor 4 measures the operating temperature, and the arithmetic device 5 acquires the operating temperature from the temperature sensor 4. In this way, it is possible to acquire an appropriate operating temperature.

Figure 6:
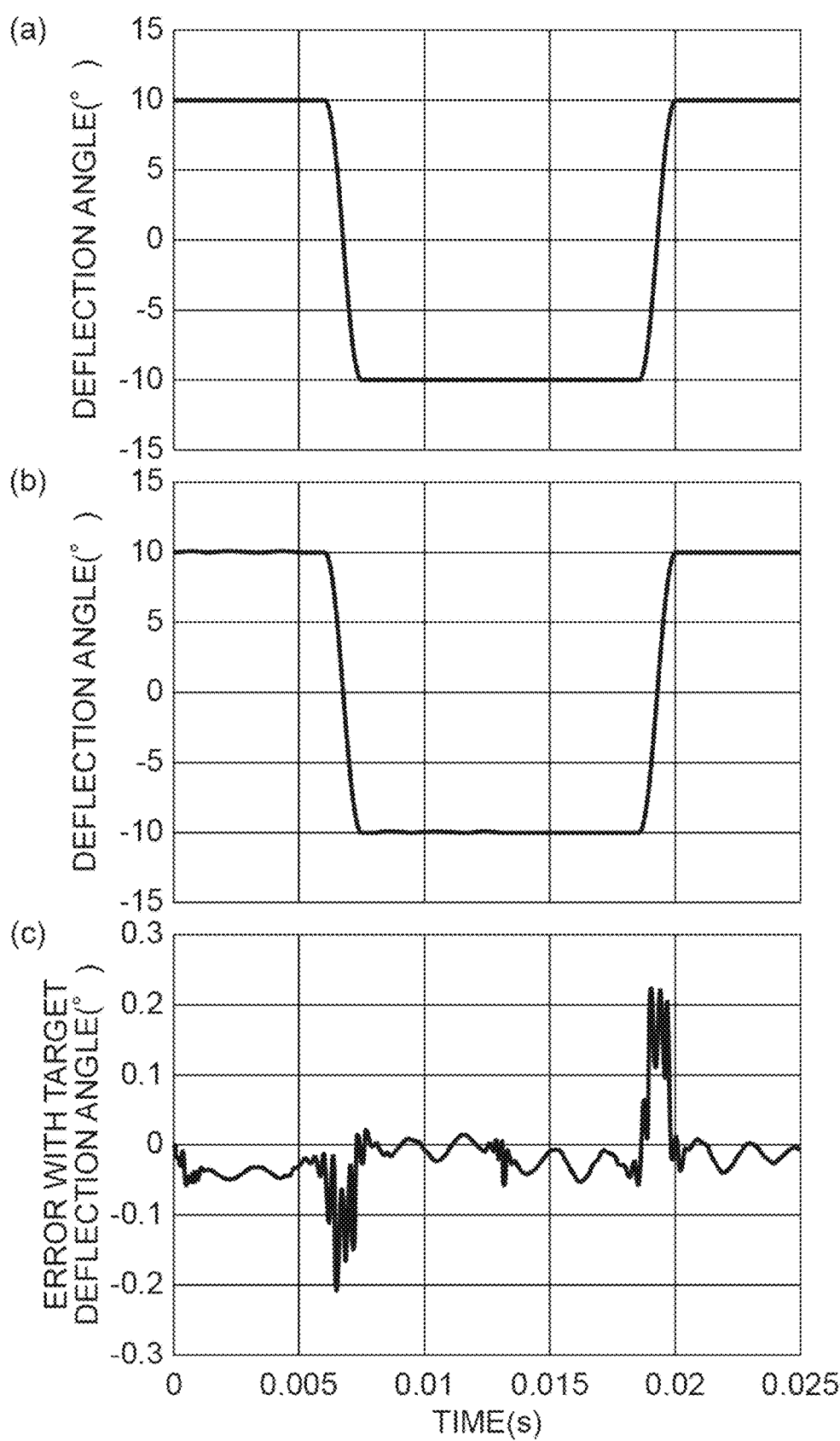
FIG. 6 is a graph illustrating verification results of examples.
Figure 7:
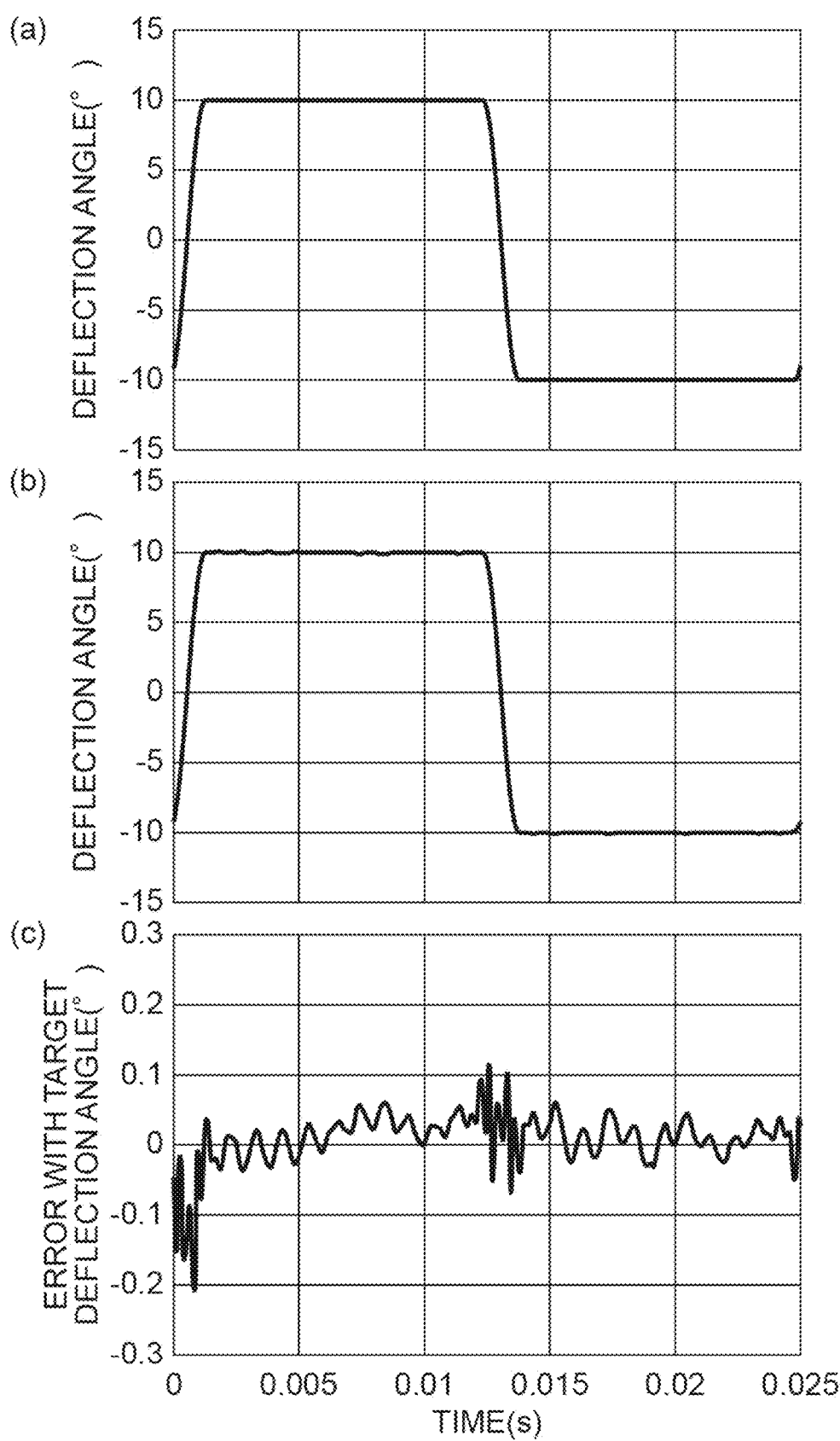
FIG. 7 is a graph illustrating verification results of examples.

Here, examples will be described with reference to FIGS. 6 and 7. (a) of FIG. 6 illustrates a target operating waveform of the mirror 24 swinging with the Y-axis as the central axis, and (a) of FIG. 7 illustrates a target operating waveform of the mirror 24 swinging with the X-axis as the central axis. Each target operating waveform is determined by a target deflection angle ($\pm 10°$) and a target frequency (40 Hz) input by the user. In these cases, when a first current signal is generated using Equation (4) to input the first current signal to the first drive coil 25, and a second current signal is generated using Equation (5) to input the second current signal to the second drive coil 26, an actual operating waveform of the mirror 24 swinging with the Y-axis as the central axis becomes as illustrated in (b) of FIG. 6, and an actual operating waveform of the mirror 24 swinging with the X-axis as the central axis becomes as illustrated in (b) of FIG. 7. For any actual operating waveform, as illustrated in (c) of FIG. 6 and (c) of FIG. 7, an error with respect to the target operating waveform (error with the target deflection angle) was suppressed to $\pm 0.05°$ or less (excluding a rising period (1 ms) and a falling period (1 ms) in each operating waveform).

Figure 8:
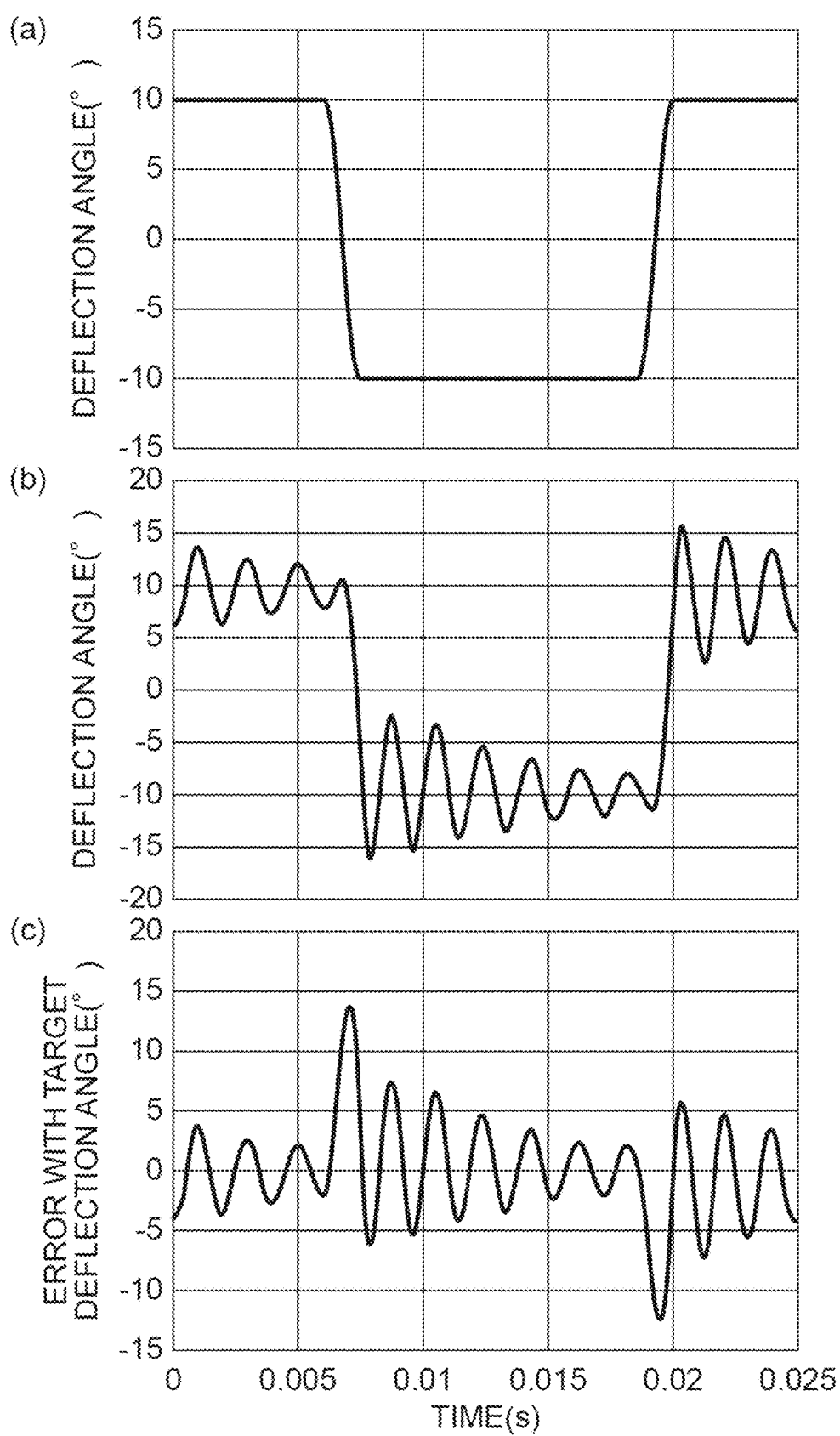
FIG. 8 is a graph illustrating verification results of comparative examples.
Figure 9:
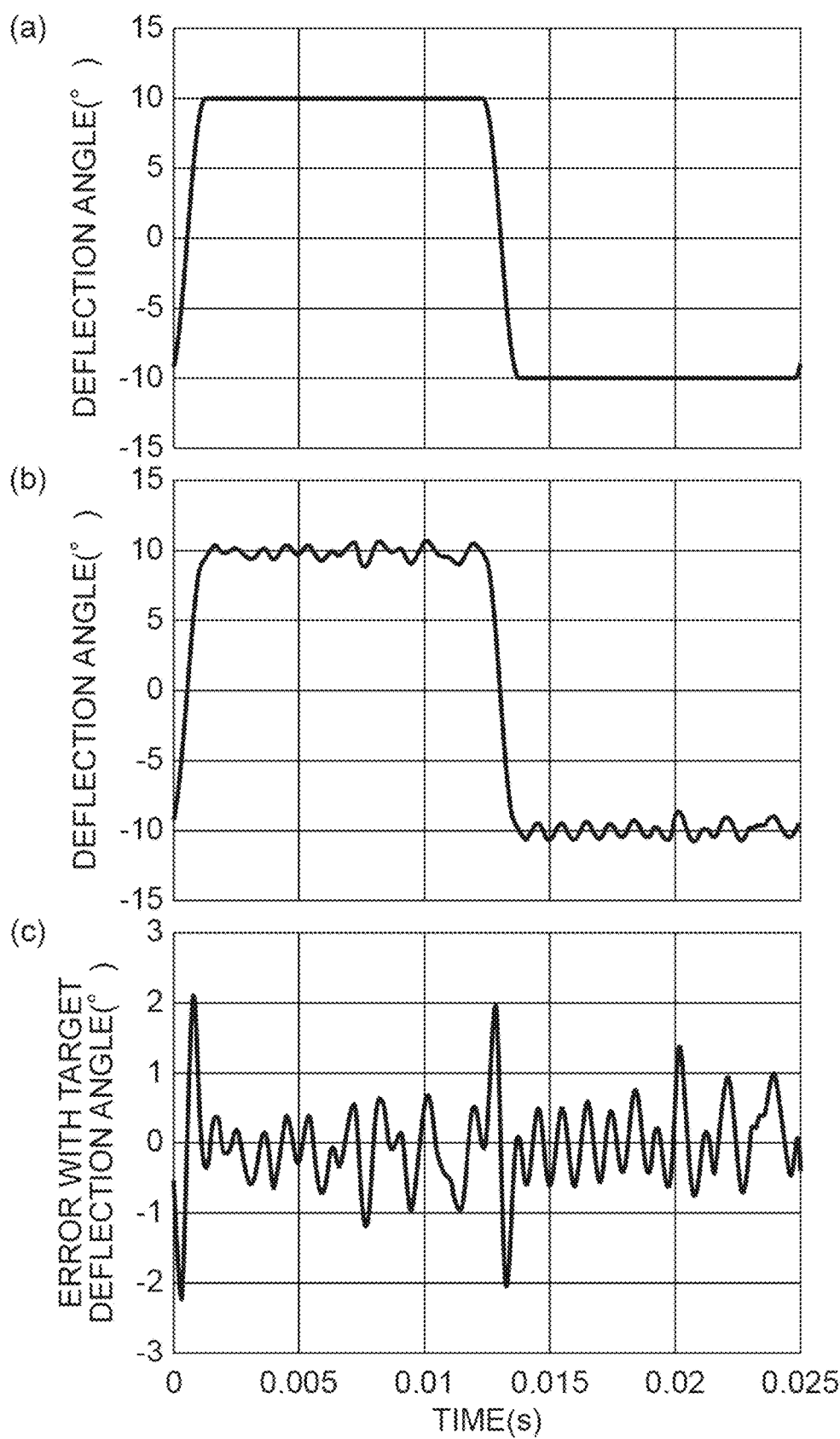
FIG. 9 is a graph illustrating verification results of comparative examples.

Next, comparative examples will be described with reference to FIGS. 8 and 9. (a) of FIG. 8 illustrates a target operating waveform of the mirror 24 swinging with the Y-axis as the central axis, and (a) of FIG. 9 illustrates a target operating waveform of the mirror 24 swinging with the X-axis as the central axis. Each target operating waveform is determined by a target deflection angle ($\pm 10°$) and a target frequency (40 Hz) input by the user, and is the same operating waveform as the target operating waveform illustrated in each of (a) of FIG. 6 and (a) of FIG. 7. In these cases, when a current signal is generated without using the first data, the second data, and the third data and the current signal is input to each of the first drive coil 25 and the second drive coil 26, an actual operating waveform of the mirror 24 swinging with the Y-axis as the central axis becomes as illustrated in (b) of FIG. 8, and an actual operating waveform of the mirror 24 swinging with the X-axis as the central axis becomes as illustrated in (b) of FIG. 9. For any actual operating waveform, as illustrated in (c) of FIG. 8 and (c) of FIG. 9, an error with respect to the target operating waveform (error with the target deflection angle) greatly exceeded $\pm 0.1°$ (excluding a rising period (1 ms) and a falling period (1 ms) in each operating waveform).

The above-mentioned examples and comparative examples demonstrated effectiveness of the light scanning system 100. In the light scanning system 100, when the user simply inputs data related to the target operating waveform, it is possible to obtain an actual operating waveform in which the error with respect to the target operating waveform is suppressed to $\pm 0.1°$ or less. Therefore, convenience of the light scanning system 100 is extremely high for the user.

[Method for Manufacturing Light Scanning System, Etc.]

Figure 10:
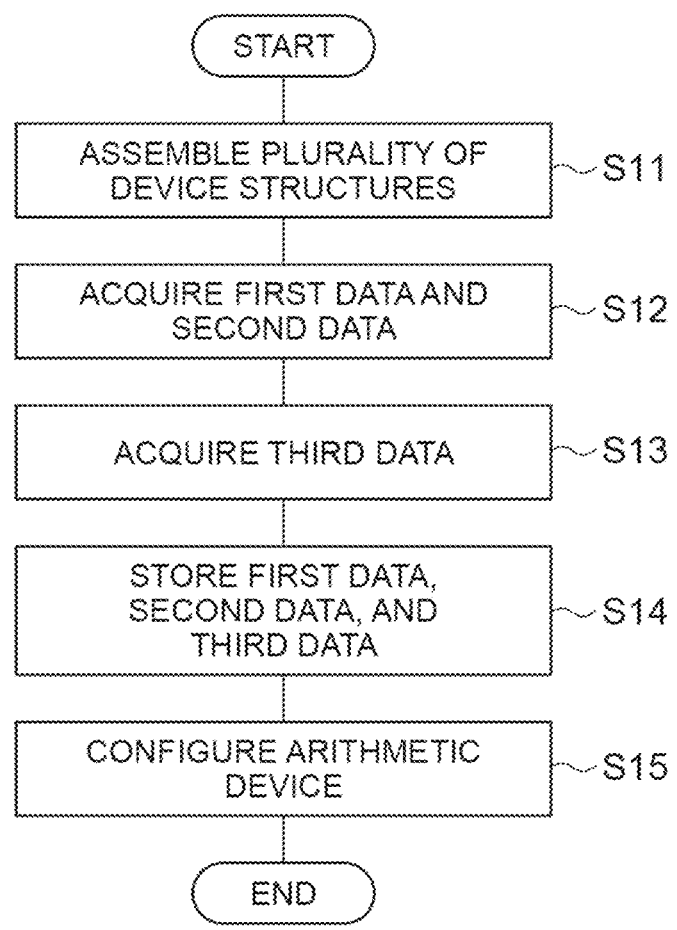
FIG. 10 is a flowchart of a method for manufacturing the light scanning system illustrated in FIG. 1.

A method for manufacturing the light scanning system 100 will be described with reference to FIG. 10. First, a process of assembling a plurality of device structures S, each of which includes the mirror device 2 and the magnet 3, is carried out (S11). In the present embodiment, the plurality of device structures S is assembled by fixing the mirror device 2 to the magnet unit 30 including the magnet 3 by, for example, adhesion, etc. That is, here, a process of fixing a position of the mirror device 2 with respect to the magnet 3 is carried out. In the present embodiment, the position of the mirror device 2 with respect to the magnet 3 is irreversibly fixed (that is, so that the mirror device 2 cannot be removed from the magnet unit 30 including the magnet 3 or a mounting state of the mirror device 2 with respect to the magnet unit 30 including the magnet 3 cannot be adjusted). Note that as long as each of the plurality of device structures S includes at least the mirror device 2 and the magnet 3, at least one of the temperature sensor 4, the arithmetic device 5, and the storage device 6 may be included or does not have to be included.

Subsequently, a process of acquiring the first data (data for correcting the change in the standard value of the deflection angle of the mirror 24 with respect to the change in the frequency of the current signal) and the second data (data for correcting the shift $\theta$ of the mirror 24 swinging with the first axis A1 as the central axis from the Y-axis) is carried out for each of the plurality of device structures S (S12). That is, here, a process of acquiring the first data and the second data is carried out in a state where the position of the mirror device 2 with respect to the magnet 3 is fixed. The first data and the second data are acquired by actually operating the mirror device 2 in a state where the position of the mirror device 2 with respect to the magnet 3 is fixed in each of the plurality of device structures S.

Subsequently, a process of acquiring the third data (data for correcting the change in the deflection angle of the mirror 24 with respect to the change in the operating temperature) is carried out for a representative device structure S among the plurality of device structures S (S13). That is, here, a process of acquiring the third data is carried out in a state where the position of the mirror device 2 with respect to the magnet 3 is fixed. The third data is acquired by actually operating the mirror device 2 in a state where the position of the mirror device 2 with respect to the magnet 3 is fixed in the representative device structure S. Note that any of the processes S12 and S13 may be carried out first, or the processes S12 and S13 may be simultaneously carried out.

Subsequently, a process of storing the first data, the second data, and the third data is carried out (S14). Specifically, the first data acquired for each of the plurality of device structures S is stored in the storage device 12 of the computer apparatus 10 included in the light scanning system 100 together with each of the plurality of device structures S in a state where a correspondence between each of the plurality of device structures S and the first data is maintained. The second data acquired for each of the plurality of device structures S is stored in the storage device 6 of the light scanning apparatus 1 included in the light scanning system 100 together with each of the plurality of device structures S in a state where a correspondence between each of the plurality of device structures S and the second data is maintained. The third data acquired for the representative device structure S is stored in the storage device 6 of the light scanning apparatus 1 included in the light scanning system 100 together with each of the plurality of device structures S.

Subsequently, a process of configuring the arithmetic device 11 of the computer apparatus 10 and the arithmetic device 5 of the light scanning apparatus 1 is carried out (S15). Specifically, the arithmetic device 11 of the computer apparatus 10 is configured to generate the standard value of the first torque and the standard value of the second torque based on the first target deflection angle and the first target frequency, the second target deflection angle and the second target frequency, and the first data. The arithmetic device 5 of the light scanning apparatus 1 is configured to acquire the standard value of the first torque and the standard value of the second torque and to generate the first current signal and the second current signal based on the standard value of the first torque and the standard value of the second torque, the operating temperature, and the second data and the third data. Note that the process of S15 is a programming process, and thus may be executed at any timing, and the arithmetic device 11 of the computer apparatus 10 and the arithmetic device 5 of the light scanning apparatus 1 may be configured at different timings.

As described above, the plurality of light scanning systems 100 is manufactured. Note that the method for manufacturing the light scanning system 100 includes a method for manufacturing the light scanning apparatus 1 and a data acquisition method for acquiring the first data, the second data, and the third data in advance.

In the present embodiment, the method for manufacturing the light scanning apparatus 1 includes the process of assembling the plurality of device structures S, the process of acquiring the first data and the second data for each of the plurality of device structures S, the process of acquiring the third data for the representative device structure S among the plurality of device structures S, the process of storing the second data acquired for each of the plurality of device structures S in the storage device 6 included in the light scanning apparatus 1 together with each of the plurality of device structures S in the state where the correspondence between each of the plurality of device structures S and the second data is maintained and storing the third data acquired for the representative device structure S in the storage device 6 included in the light scanning apparatus 1 together with each of the plurality of device structures S, and the process of acquiring the standard value of the first torque and the standard value of the second torque and configuring the arithmetic device 5 to generate the first current signal and the second current signal based on the standard value of the first torque and the standard value of the second torque, the operating temperature, and the second data and the third data.

Further, in the present embodiment, the data acquisition method further includes the process of fixing the position of the mirror device 2 with respect to the magnet 3, the process of acquiring the first data and the second data in the state where the position of the mirror device 2 with respect to the magnet 3 is fixed, and the process of acquiring the third data in the state where the position of the mirror device 2 with respect to the magnet 3 is fixed.

[Actions and Effects of Method for Manufacturing Light Scanning System, Etc.]

The present inventors have found that when the mirror 24 is swung in a linear mode with each of the first axis A1 and the second axis A2 as the central axis, the change in the standard value of the deflection angle of the mirror 24 with respect to the change in the frequency of the current signal input to each of the first drive coil 25 and the second drive coil 26 varies for each individual (that is, for each combination of the mirror device 2 and the magnet 3), the shift of the mirror 24 swinging with the first axis A1 as the central axis from the Y-axis and the shift of the mirror 24 swinging with the second axis A2 as the central axis from the X-axis vary for each individual, and the change in the deflection angle of the mirror 24 with respect to the change in the operating temperature is mainly caused by the temperature characteristic of the magnet 3. Therefore, by manufacturing the light scanning system 100 as described above, in the manufactured light scanning system 100, the mirror 24 can be swung at the first target deflection angle and the first target frequency with the X-axis as the central axis, and the mirror 24 can be swung at the second target deflection angle and the second target frequency with the Y-axis as the central axis. Note that the third data for correcting the change in the deflection angle of the mirror 24 with respect to the change in the operating temperature is acquired for the representative device structure S among the plurality of device structures S, and the third data acquired for the representative device structure S is stored in the storage device 6 included in the light scanning apparatus 1 together with each of the plurality of device structures S since the change in the deflection angle of the mirror 24 with respect to the change in the operating temperature is mainly caused by the temperature characteristic of the magnet 3 (the magnetic field generated by the magnet 3 changes due to the change in the operating temperature) as described above. As described above, according to the method for manufacturing the light scanning system 100, it is possible to manufacture the light scanning system 100 capable of implementing high-precision operation when the mirror 24 is swung in the linear mode with each of the first axis A1 and the second axis A2 as the central axis.

Further, according to the method for manufacturing the light scanning system 100, the arithmetic device 11 of the computer apparatus 10 is configured to generate the standard value of the first torque and the standard value of the second torque based on the first target deflection angle and the first target frequency, the second target deflection angle and the second target frequency, and the first data. Further, the arithmetic device 5 of the light scanning apparatus 1 is configured to acquire the standard value of the first torque and the standard value of the second torque and generate the first current signal and the second current signal based on the standard value of the first torque and the standard value of the second torque, the operating temperature, and the second data and the third data. In this way, in the manufactured light scanning system 100, it is possible to easily obtain the accurate first current signal and second current signal.

Further, according to the method for manufacturing the light scanning apparatus 1, for the same reason as described above, it is possible to manufacture the light scanning apparatus 1 capable of implementing high-precision operation when the mirror 24 is swung in the linear mode with each of the first axis A1 and the second axis A2 as the central axis.

Further, in the data acquisition method, since the first data and the second data are acquired in the state where the position of the mirror device 2 with respect to the magnet 3 is fixed, the first data and the second data varying for each individual can be acquired with high accuracy.

Further, in the data acquisition method, the third data is acquired in the state where the position of the mirror device 2 with respect to the magnet 3 is fixed. In this way, the third data can be acquired with high accuracy. Further, as described above, since the change in the deflection angle of the mirror 24 with respect to the change in the operating temperature of the mirror device 2 and the magnet 3 is mainly caused by the temperature characteristic of the magnet 3, it is possible to use the third data acquired with high accuracy in another light scanning apparatus 1, another light scanning system 100, etc.

In particular, since the first data, the second data, and the third data are acquired in a state where the position of the mirror device 2 with respect to the magnet 3 is irreversibly fixed, even after the light scanning apparatus 1 is shipped, the characteristic of the light scanning apparatus 1 do not change, and as a result, high-precision control can be performed in the light scanning apparatus 1.

[Modification]

The present disclosure is not limited to the embodiment. For example, in the embodiment, the second data is data for correcting the shift of the mirror 24 swinging with the first axis A1 as the central axis from the Y-axis when the second axis A2 is regarded as the Y-axis, and the second current signal is generated to correct the shift of the mirror 24 swinging with the first axis A1 as the central axis from the Y-axis. However, for example, the second data may be data for correcting the shift of the mirror 24 swinging with the second axis A2 as the central axis from the X-axis when the first axis A1 is regarded as the X-axis. In that case, the first current signal may be generated to correct the mirror 24 swinging with the second axis A2 as the central axis from the X-axis. In this way, it is sufficient that the second data is data for correcting at least one of the shift of the mirror 24 swinging with the first axis A1 as the central axis from the Y-axis and the shift of the mirror 24 swinging with the second axis A2 as the central axis from the X-axis.

Further, as described above, the change in the deflection angle of the mirror 24 with respect to the change in the operating temperature mainly results from the fact that the magnetic field generated by the magnet 3 changes due to the change in the operating temperature. Therefore, as the third data for correcting the change in the deflection angle of the mirror 24 with respect to the change in the operating temperature, it is possible to use data for correcting the change in the magnetic field of the magnet 3 with respect to the change in the operating temperature. Further, as the third data (data for correcting the change in the deflection angle of the mirror 24 with respect to the change in the operating temperature), attention may be paid to the change in the standard value of the deflection angle of the mirror 24 with respect to the change in the operating temperature. The standard value of the deflection angle of the mirror 24 here is a value standardized by setting the deflection angle of the mirror 24 to 1 when the current value is constant and the operating temperature is a reference temperature (for example, 25° C.).

Further, in the light scanning system 100 of the embodiment, the arithmetic device 5 and the arithmetic device 11 are included in the arithmetic part, and the storage device 6 and the storage device 12 are included in the storage part. However, for example, the arithmetic part may only include the arithmetic device 11 of the computer apparatus 10 without providing the light scanning apparatus 1 with the arithmetic device 5 and the storage device 6, and the storage part may only include the storage device 12 of the computer apparatus 10.

Further, in the light scanning system 100 of the embodiment, the first data, the second data, and the third data are stored in the storage part including the storage device 6 and the storage device 12. However, at least one of the first data, the second data, and the third data may be stored in, for example, a server provided outside the light scanning system 100. In that case, the arithmetic part including the arithmetic device 5 and the arithmetic device 11 may acquire at least one of the first data, the second data, and the third data from the server.

Further, in the light scanning system 100 of the embodiment, the arithmetic part including the arithmetic device 5 and the arithmetic device 11 acquires the first target deflection angle and the first target frequency, and the second target deflection angle and the second target frequency from the input reception part 13 of the computer apparatus 10. However, for example, the arithmetic part including the arithmetic device 5 and the arithmetic device 11 may acquire the first target deflection angle and the first target frequency, and the second target deflection angle and the second target frequency from another computer apparatus provided outside the light scanning system 100.

Further, in the embodiment, the temperature sensor 4 is provided in the mirror device 2. However, the temperature sensor 4 may be provided separately from the mirror device 2. In that case, for example, a thermistor, a thermoelectric pair, etc. can be used as the temperature sensor 4. Further, the light scanning apparatus 1 does not have to include the temperature sensor 4, and a temperature sensor for measuring the operating temperature may be provided outside the light scanning apparatus 1. Further, in the embodiment, the light scanning system 100 includes the light source 20. However, the light source 20 may be provided outside the light scanning system 100. Further, in the embodiment, the light source 20 is provided outside the light scanning apparatus 1. However, the light scanning apparatus 1 may include the light source 20.

In addition, a target drive waveform determined by the first target deflection angle and the first target frequency, and a target drive waveform determined by the second target deflection angle and the second target frequency may have waveforms other than a rectangular wave. In that case, the first current signal and the second current signal may have waveforms other than a rectangular wave.

Further, in the method for manufacturing the light scanning system of the embodiment, the first data (data for correcting the change in the standard value of the deflection angle of the mirror 24 with respect to the change in the frequency of the current signal) is acquired by actually operating the mirror device 2. However, the first data may be acquired theoretically (by calculation) based on the resonance frequency of the mirror 24 and the Q-value thereof.

Further, as long as the first data is data for correcting the change in the deflection angle of the mirror 24 with respect to the change in the frequency of the current signal, the first data may be data for correcting the change in "the standardized deflection angle of the mirror 24 (that is, the standard value of the deflection angle of the mirror 24)" with respect to the change in the frequency of the current signal as in the embodiment, or may be data for correcting the change in "an unstandardized deflection angle of the mirror 24" with respect to the change in the frequency of the current signal. However, when the change in the standard value of the deflection angle of the mirror 24 with respect to the change in the frequency of the current signal is used as in the embodiment, it is possible to facilitate calculation in the arithmetic device 11.

Further, as long as the third data is data for correcting the change in the deflection angle of the mirror 24 with respect to the change in the operating temperature, the third data may be data for correcting the change in "the unstandardized deflection angle of the mirror 24" with respect to the change in the operating temperature as in the embodiment, or may be data for correcting the change in "the standardized deflection angle of the mirror 24 (that is, the standard value of the deflection angle of the mirror 24)" with respect to the change in the operating temperature. However, when the change in the standard value of the deflection angle of the mirror 24 with respect to the change in the operating temperature is used, it is possible to facilitate calculation in the arithmetic device 5.

Further, in the embodiment, the third data is acquired for the representative device structure S. However, the third data may be acquired for each of the plurality of device structures S. In that case, the second data and the third data acquired for each of the plurality of device structures S may be stored in the storage device 6 included in the light scanning apparatus 1 together with each of the plurality of device structures S in a state where the correspondence between each of the plurality of device structures S and the second data and the third data is maintained. When the third data is acquired for the representative device structure S as in the embodiment, the process of acquiring the third data may be facilitated in the method for manufacturing the light scanning system, the method for manufacturing the light scanning apparatus, and the data acquisition method. As a result, it is possible to efficiently manufacture the light scanning system 100 and the light scanning apparatus 1 capable of implementing high-precision operation. When the third data is acquired for each of the plurality of device structures S, the arithmetic device 5 can perform high-precision calculation. As a result, it is possible to manufacture the light scanning system 100 and the light scanning apparatus 1 capable of implementing higher-precision operation.

Further, in the embodiment, the first current signal is directly input to the first drive coil 25, and the second current signal is directly input to the second drive coil 26. However, by applying a voltage to each of the first drive coil 25 and the second drive coil 26, the first current signal may be input to the first drive coil 25, and the second current signal may be input to the second drive coil 26.

Further, the light scanning apparatus 1 and the light scanning system 100 are not limited to those two-dimensionally scanning the laser light L, and may be those one-dimensionally scanning the laser light L. For example, the light scanning apparatus 1 and the light scanning system 100 may be configured so that the laser light L is one-dimensionally scanned along the Y-axis by swinging the first movable part 21 with the first axis A1 along the X-axis as the central axis, and the shift of the laser light L from a direction along the Y-axis is corrected by swinging the second movable part 22 with the second axis A2 along the Y-axis as the central axis. At this time, the first current signal input to the first drive coil 25 is a current signal for swinging the mirror 24 at "the first target deflection angle having a value larger than 0" and "the first target frequency having a value larger than 0" with the X-axis as the central axis, and the second current signal input to the second drive coil 26 is a current signal for swinging the mirror 24 at "the second target deflection angle which is 0" and "the second target frequency which is 0" with the Y-axis as the central axis (that is, for not swinging the mirror 24 with the Y-axis as the central axis). Alternatively, the light scanning apparatus 1 and the light scanning system 100 may be configured so that the laser light L is one-dimensionally scanned along the X-axis by swinging the second movable part 22 with the second axis A2 along the Y-axis as the central axis, and the shift of the laser light L from a direction along the X-axis is corrected by swinging the first movable part 21 with the first axis A1 along the X-axis as the central axis. At this time, the second current signal input to the second drive coil 26 is a current signal for swinging the mirror 24 at "the second target deflection angle having a value larger than 0" and "the second target frequency having a value larger than 0" with the Y-axis as the central axis, and the first current signal input to the first drive coil 25 is a current signal for swinging the mirror 24 at "the first target deflection angle which is 0" and "the first target frequency which is 0" with the X-axis as the central axis (that is, for not swinging the mirror 24 with the X-axis as the central axis). As described above, the second current signal for swinging the mirror 24 at the second target deflection angle and the second target frequency with the Y-axis as the central axis includes the current signal for swinging the mirror 24 at "the second target deflection angle which is 0" and "the second target frequency which is 0" with the Y-axis as the central axis (that is, for not swinging the mirror 24 with the Y-axis as the central axis). In addition, the first current signal for swinging the mirror 24 at the first target deflection angle and the first target frequency with the X-axis as the central axis includes the current signal for swinging the mirror 24 at "the first target deflection angle which is 0" and "the first target frequency which is 0" with the X-axis as the central axis (that is, for not swinging the mirror 24 with the X-axis as the central axis).

Further, the first data and the second data acquired for each of the plurality of device structures S, and the third data acquired for the representative device structure S may be stored in one storage part provided for the plurality of device structures S in a state where a correspondence between each of the plurality of device structures S and the first data and the second data is stored. In addition, the first data, the second data, and the third data acquired for each of the plurality of device structures S may be stored in one storage part provided for the plurality of device structures S in a state where a correspondence between each of the plurality of device structures S and the first data, the second data, and the third data is stored.

REFERENCE SIGNS LIST

1: Light scanning apparatus, 2: Mirror device, 3: Magnet, 4: Temperature sensor, 5: Arithmetic device (arithmetic part), 6: Storage device (storage part), 11: Arithmetic device (arithmetic part), 12: Storage device (storage part), 13: Input reception part, 21: First movable part, 22: Second movable part, 23: Support, 24: mirror, 25: First drive coil, 26: Second drive coil, 100: Light scanning system, A1: First axis, A2: Second axis.

The invention claimed is:
1. A light scanning system comprising:
a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis;
a magnet configured to generate a magnetic field to act on the first drive coil and the second drive coil;
a temperature sensor configured to measure an operating temperature of the mirror device and the magnet; and
an arithmetic part configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil,
wherein the arithmetic part
acquires the first target deflection angle and the first target frequency, and the second target deflection angle and the second target frequency,
acquires the operating temperature from the temperature sensor, and
generates the first current signal and the second current signal based on the first target deflection angle and the first target frequency, the second target deflection angle and the second target frequency, the operating temperature, first data for correcting a change in a deflection angle of the mirror with respect to a change in a frequency of a current signal input to each of the first drive coil and the second drive coil, second data for correcting at least one of a shift of the mirror swinging with the first axis as a central axis from the Y-axis and a shift of the mirror swinging with the second axis as a central axis from the X-axis, and third data for correcting a change in a deflection angle of the mirror with respect to a change in the operating temperature.

2. The light scanning system according to claim 1, further comprising
a storage part configured to store the first data, the second data, and the third data,
wherein the arithmetic part acquires the first data, the second data, and the third data from the storage part.

3. The light scanning system according to claim 1, further comprising
an input reception part configured to receive inputs of the first target deflection angle and the first target frequency, and the second target deflection angle and the second target frequency,
wherein the arithmetic part acquires the first target deflection angle and the first target frequency, and the second target deflection angle and the second target frequency from the input reception part.

4. The light scanning system according to claim 1,
wherein the second data is data for correcting a shift of the mirror swinging with the first axis as a central axis from the Y-axis when the second axis is regarded as the Y-axis, and
the arithmetic part generates the second current signal to correct a shift of the mirror swinging with the first axis as a central axis from the Y-axis.

5. A light scanning apparatus comprising:
a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis;
a magnet configured to generate a magnetic field to act on the first drive coil and the second drive coil; and
an arithmetic device configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil,
wherein the arithmetic device
acquires data based on the first target deflection angle and the first target frequency, the second target deflection angle and the second target frequency, and first data for correcting a change in a deflection angle of the mirror with respect to a change in a frequency of a current signal input to each of the first drive coil and the second drive coil,
acquires an operating temperature of the mirror device and the magnet, and
generates the first current signal and the second current signal based on the data, the operating temperature, second data for correcting at least one of a shift of the mirror swinging with the first axis as a central axis from the Y-axis and a shift of the mirror swinging with the second axis as a central axis from the X-axis, and third data for correcting a change in a deflection angle of the mirror with respect to a change in the operating temperature.

6. The light scanning apparatus according to claim 5, further comprising
a temperature sensor configured to measure the operating temperature,
wherein the arithmetic device acquires the operating temperature from the temperature sensor.

7. The light scanning apparatus according to claim 5, further comprising
a storage device configured to store the second data and the third data,
wherein the arithmetic device acquires the second data and the third data from the storage device.

8. The light scanning apparatus according to claim 5,
wherein the second data is data for correcting a shift of the mirror swinging with the first axis as a central axis from the Y-axis when the second axis is regarded as the Y-axis, and the arithmetic device generates the second current signal to correct a shift of the mirror swinging with the first axis as a central axis from the Y-axis.

9. A light scanning system comprising:

a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis;

a magnet configured to generate a magnetic field to act on the first drive coil and the second drive coil; and an arithmetic part configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil, wherein the arithmetic part acquires the first target deflection angle and the first target frequency, and the second target deflection angle and the second target frequency, and generates the first current signal and the second current signal based on the first target deflection angle and the first target frequency, the second target deflection angle and the second target frequency, and at least one data of first data, second data, and third data, the first data is data for correcting a change in a deflection angle of the mirror with respect to a change in a frequency of a current signal input to each of the first drive coil and the second drive coil, the second data is data for correcting at least one of a shift of the mirror swinging with the first axis as a central axis from the Y-axis and a shift of the mirror swinging with the second axis as a central axis from the X-axis, and the third data is data for correcting a change in a deflection angle of the mirror with respect to a change in an operating temperature.

10. The light scanning system according to claim 9,
wherein the arithmetic part generates the first current signal and the second current signal based on the first target deflection angle and the first target frequency, the second target deflection angle and the second target frequency, and at least the first data of the first data, the second data, and the third data.

11. The light scanning system according to claim 9,
wherein the arithmetic part generates the first current signal and the second current signal based on the first target deflection angle and the first target frequency, the second target deflection angle and the second target frequency, and at least the second data of the first data, the second data, and the third data.

12. The light scanning system according to claim 9,
wherein the arithmetic part generates the first current signal and the second current signal based on the first target deflection angle and the first target frequency, the second target deflection angle and the second target frequency, and at least the third data of the first data, the second data, and the third data.

13. The light scanning system according to claim 9,
wherein the arithmetic part generates the first current signal and the second current signal based on the first target deflection angle and the first target frequency, the second target deflection angle and the second target frequency, and at least the first data and the third data of the first data, the second data, and the third data.

14. A light scanning apparatus comprising:

a mirror device having a first movable part provided with a mirror and a first drive coil, a second movable part provided with a second drive coil, the second movable part supporting the first movable part so that the mirror is allowed to swing with a first axis along an X-axis as a central axis, and a support supporting the second movable part so that the mirror is allowed to swing with a second axis along a Y-axis intersecting the X-axis as a central axis;

a magnet configured to generate a magnetic field to act on the first drive coil and the second drive coil; and an arithmetic device configured to input a first current signal for swinging the mirror at a first target deflection angle and a first target frequency with the X-axis as a central axis to the first drive coil, and input a second current signal for swinging the mirror at a second target deflection angle and a second target frequency with the Y-axis as a central axis to the second drive coil, wherein the arithmetic device generates the first current signal and the second current signal based on the first target deflection angle and the first target frequency, the second target deflection angle and the second target frequency, and at least one data of first data, second data, and third data, the first data is data for correcting a change in a deflection angle of the mirror with respect to a change in a frequency of a current signal input to each of the first drive coil and the second drive coil, the second data is data for correcting at least one of a shift of the mirror swinging with the first axis as a central axis from the Y-axis and a shift of the mirror swinging with the second axis as a central axis from the X-axis, and the third data is data for correcting a change in a deflection angle of the mirror with respect to a change in an operating temperature.

15. The light scanning apparatus according to claim 14,
wherein the arithmetic device generates the first current signal and the second current signal based on the first target deflection angle and the first target frequency, the second target deflection angle and the second target frequency, and at least the first data of the first data, the second data, and the third data.

16. The light scanning apparatus according to claim 14,
wherein the arithmetic device generates the first current signal and the second current signal based on the first target deflection angle and the first target frequency, the second target deflection angle and the second target frequency, and at least the second data of the first data, the second data, and the third data.

17. The light scanning apparatus according to claim 14,
wherein the arithmetic device generates the first current signal and the second current signal based on the first target deflection angle and the first target frequency, the second target deflection angle and the second target frequency, and at least the third data of the first data, the second data, and the third data.

18. The light scanning apparatus according to claim 14, wherein the arithmetic device generates the first current signal and the second current signal based on the first target deflection angle and the first target frequency, the second target deflection angle and the second target frequency, and at least the first data and the third data of the first data, the second data, and the third data.

19. The light scanning apparatus according to claim 14, further comprising
a temperature sensor configured to measure the operating temperature,
wherein the arithmetic device acquires the operating temperature from the temperature sensor.

\* \* \* \* \*